US009683646B2

(12) United States Patent
Imoto

(10) Patent No.: US 9,683,646 B2
(45) Date of Patent: Jun. 20, 2017

(54) DIFFERENTIAL DEVICE AND METHOD OF MANUFACTURING THE DIFFERENTIAL DEVICE

(71) Applicant: MUSASHI SEIMITSU INDUSTRY CO., LTD., Toyohashi-shi, Aichi (JP)

(72) Inventor: Hideaki Imoto, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 33 days.

(21) Appl. No.: 14/951,998

(22) Filed: Nov. 25, 2015

(65) Prior Publication Data

US 2016/0153538 A1    Jun. 2, 2016

(30) Foreign Application Priority Data

Nov. 28, 2014    (JP) .................................. 2014-241637

(51) Int. Cl.
  *F16H 48/40*    (2012.01)
  *F16H 48/08*    (2006.01)
  *F16H 48/38*    (2012.01)

(52) U.S. Cl.
  CPC ............. *F16H 48/40* (2013.01); *F16H 48/08* (2013.01); *F16H 2048/085* (2013.01); *F16H 2048/382* (2013.01)

(58) Field of Classification Search
  CPC ..... F16H 2048/085; F16H 48/40; F16H 48/08
  See application file for complete search history.

(56) References Cited

U.S. PATENT DOCUMENTS

| 702,747 | A | * | 6/1902 | Saxon | ..................... F16H 48/08 464/67.1 |
| 6,210,299 | B1 | * | 4/2001 | Yoshioka | ................ F16H 48/08 475/230 |
| 6,849,021 | B2 | * | 2/2005 | Krzesicki | ................ F16H 48/08 475/233 |
| 8,360,921 | B2 | | 1/2013 | Finkenzeller et al. | |
| 2013/0281252 | A1 | * | 10/2013 | Fuchs | ..................... F16H 48/08 475/230 |

FOREIGN PATENT DOCUMENTS

DE    10 2009 055 867 A1    6/2011
JP          2008-144807 A    6/2008

* cited by examiner

*Primary Examiner* — Sherry Estremsky
(74) *Attorney, Agent, or Firm* — Carrier Blackman & Associates, P.C.; Joseph P. Carrier; William D. Blackman

(57) ABSTRACT

In a differential device which includes: a cross-shaped shaft body integrally including a first shaft and a second shaft orthogonal to each other, and configured to rotate integrally with an input member around an axis of the second shaft; a pinion pivotally supported on the first shaft; and a pair of side gears meshing with the pinion, the side gears respectively include small-diameter holes supporting the second shaft such that the second shaft passes through the small-diameter holes, and large-diameter holes continuous to outer ends of the small-diameter holes via step surfaces. The large-diameter holes respectively house fixing members connected to both end portions of the second shaft so as to block the side gears from coming off the second shaft, and output shafts are relatively unrotatably fitted in inner peripheral surfaces of the large-diameter holes outside the fixing members in an axial direction.

6 Claims, 4 Drawing Sheets

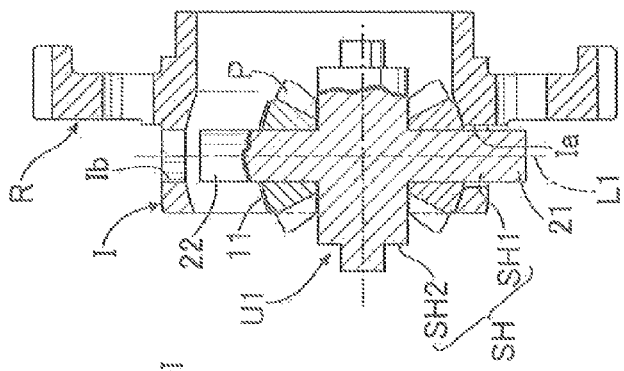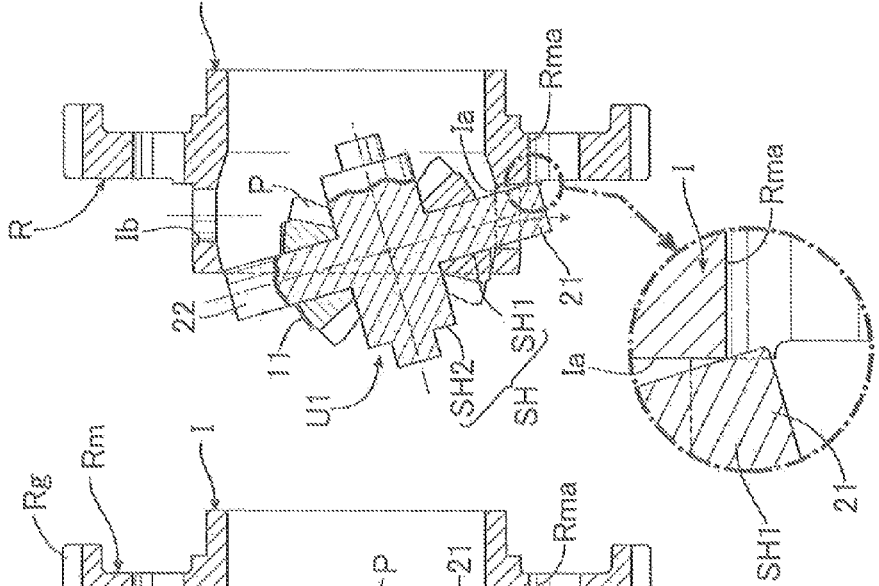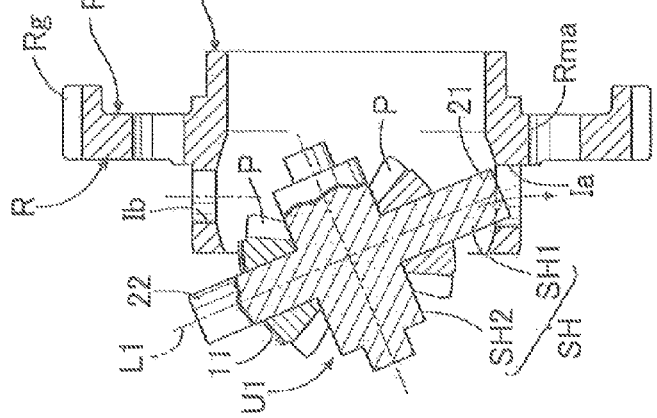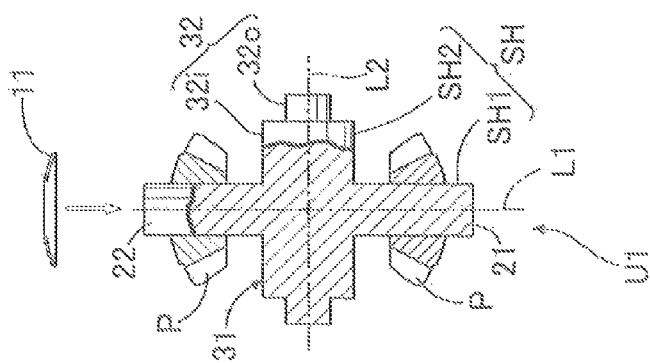

FIG.4A FIG.4B FIG.4C

DIFFERENTIAL DEVICE AND METHOD OF MANUFACTURING THE DIFFERENTIAL DEVICE

BACKGROUND OF THE INVENTION

Field of the Invention

The present invention relates to an improvement of a differential device, particularly the differential device which includes: an annular input member into which rotational force is inputted; a cross-shaped shaft body integrally including a first shaft having both end portions supported on the input member, and a second shaft orthogonal to the first shaft, the cross-shaped shaft body configured to rotate integrally with the input member around an axis of the second shaft, a pinion rotatably supported on the first shaft; and a pair of side gears meshing with the pinion and respectively connected to a pair of output shafts, the differential device configured to distributively transmit the rotational force which is transmitted from the input member to the cross-shaped shaft body to the pair of output shafts via the pinion and the pair of side gears.

Description of the Related Art

Conventionally, such a differential device has been publicly known as described in U.S. Pat. No. 8,360,921, for example. In this conventional differential device, a pinion shaft (a first shaft) is directly fixed to an annular input member, which enables omission of a differential case for performing power transmission between the annular input member and the pinion shaft. However, in order to retain the side gears at positions where the side gears are meshed with the pinions, it is necessary to specially provide a side-gear retaining case for housing a differential mechanism therein.

In the conventional differential device, even though the differential case for the power transmission can be omitted, it is necessary to provide the relatively large side gear retaining case for housing the differential mechanism including the pinions, the pinion shaft and the side gears. For this reason, there is a problem that the omission of the differential case does not lead to sufficient simplification of a structure and weight reduction in the differential device as a whole. Furthermore, there are problems such as difficulty in accuracy assurance of the differential mechanism alone and the like, because the differential mechanism cannot be assembled as a single unit with predetermined precision unless the side gear retaining case is integrally assembled to the differential mechanism.

SUMMARY OF THE INVENTION

The present invention has been made with the foregoing situation taken into consideration. An object of the present invention is to provide a differential device and a method of manufacturing the differential device, which are capable of solving the above-mentioned problems while omitting a differential case.

In order to achieve the object, a differential device according to the present invention, comprises: an input member inputted with rotational force and being formed in an annular shape; a cross-shaped shaft body integrally including a first shaft having both end portions supported on the input member, and a second shaft orthogonal to the first shaft, the cross-shaped shaft body configured to rotate integrally with the input member around an axis of the second shaft, a pinion rotatably supported on the first shaft; and a pair of side gears meshing with the pinion and respectively connected to a pair of output shafts, the differential device configured to distributively transmit the rotational force which is transmitted from the input member to the cross-shaped shaft body to the pair of output shafts via the pinion and the pair of side gears, wherein the side gears respectively include small-diameter holes relatively rotatably supporting the second shaft such that the second shaft passes through the small-diameter holes, and large-diameter holes continuous to outer ends of the small-diameter holes in an axial direction via step surfaces and opened in outer side surfaces of the side gears, the large-diameter holes respectively house fixing members, the fixing members connecting to both end portions of the second shaft and blocking the side gears from coming off the second shaft, and the output shafts are relatively unrotatably fitted in the large-diameter holes outside the fixing members in an axial direction. (This is a first characteristic of the present invention.)

According to the first characteristic, the side gears respectively include: the small-diameter holes relatively rotatably supporting the second shaft of the cross-shaped shaft body such that the second shaft passes through the small-diameter holes; and the large-diameter holes continuous to the outer ends of the small-diameter holes via the step surfaces and opened in the outer side surfaces of the side gears. In addition, the large-diameter holes respectively house the fixing members, the fixing members connecting to the end portions of the second shaft and blocking the side gears from coming off the second shaft. Thus, the fixing members make it possible to accurately retain the side gears on the second shaft of the cross-shaped shaft body with predetermined assembling precision. Thereby, the differential mechanism including the pinion, the cross-shaped shaft body and the both side gears can be handled as a single assembled unit, and it is not necessary to specially provide any large-size case for covering the differential mechanism or any conventional differential case in order to fix the side gears at the assembled positions (i.e., keep the assembled state of the differential mechanism). This can make great contributions to simplification of the structure and weight reduction in the differential device as a whole, and accordingly cost reduction. Furthermore, since the case-less differential mechanism can be assembled as a single unit with predetermined precision, the accuracy assurance of the differential mechanism alone is made possible. Moreover, since the output shafts are relatively unrotatably fitted in the larger-diameter holes of the side gears outside the fixing members in the axial direction, the output shafts and the second shaft can be easily connected together without interfering with the fixing members.

In the differential device according to the present invention, preferably, annular washers are clamped between the fixing members and the step surfaces so as to allow relative rotation therebetween. (This is a second characteristic of the present invention.)

According to the second characteristic, the annular washers are clamped between the fixing members and the step surfaces of the side gears so as to allow the relative rotation therebetween. Here, the relative positions of the side gears in the axial direction with respect to the second shaft have to be set with taking the backlash of the meshing portion between the pinion and the side gears or the like into consideration. In this connection, selective use of washers with different thicknesses enables accurately adjustment of spaces between the fixing members and the side gears. Thereby, it is easy to make the accuracy assurance of the differential mechanism alone.

In the differential device according to the present invention, preferably, in the input member, a pair of support holes in which the both end portions of the first shaft are fitted and supported are provided coaxially with the first shaft, one support hole of the support holes has an inner diameter which is larger than an outer diameter of the one end portion of the first shaft so as to allow the one end portion to be inserted into the one support hole with the first shaft put in an orientation inclined to an axis of the support hole, and an insert coaxially retaining the one end portion in the one support hole is provided between the one end portion and the one support hole. (This is a third characteristic of the present invention.)

In addition, a method of manufacturing the differential device according to the present invention, preferably, comprises at least the steps of: obtaining a sub-assembly by assembling the pinion to the first shaft of the cross-shaped shaft body; inserting the one end portion of the first shaft into the one support hole with the sub-assembly put in an inclined orientation where the first shaft is inclined to the axis of the support holes of the input member, and thereafter inserting the other end portion of the first shaft into the other support hole by moving the sub-assembly in a direction along an axis of the first shaft with the inclined orientation corrected; subsequently, attaching the insert by inserting the insert between the one end portion of the first shaft and the one support hole so as to coaxially retain the one end portion in the one support hole and fix the first shaft to the input member; and subsequently, fitting the small-diameter holes of the pair of side gears to the both end portions of the second shaft, and thereafter connecting the pair of fixing members to the both end portions of the second shaft inside the large-diameter holes so as to retain the both side gears on the both end portions of the second shaft such that the side gears are blocked from coming off the both end portions. (This is a fourth characteristic of the present invention.)

According to the third and fourth characteristics, the sub-assembly is obtained by assembling the pinion to the first shaft of the cross-shaped shaft body; subsequently, the one end portion of the first shaft is inserted into the one support hole with the sub-assembly put in the inclined orientation, and thereafter the other end portion of the first shaft is inserted into the other support hole by moving the sub-assembly in the direction along the axis of the first shaft in the inclined orientation corrected; subsequently, the one end portion of the first shaft is coaxially retained in the one support hole with the insert attached by being inserted between the one end portion and the one support hole, and the first shaft is fixed to the input member; and subsequently, the small-diameter holes of the pair of side gears are respectively fitted to the both end portions of the second shaft, and thereafter the pair of fixing members are respectively connected to the both end portions of the second shaft inside the large-diameter holes, so that the both side gears can be retained on the both end portions of the second shaft such that the side gears are blocked from coming off the end portions. Thus, the sub-assembly as the small assembled body obtained by installing the pinion into the cross-shaped shaft body in advance can be assembled to the input member at a time, and the pair of side gears can be easily assembled to the assembled body. On the whole, this makes work of assembling the differential device easy to perform, and contributes to an improvement in productivities.

The above and other objects, characteristics and advantages of the present invention will be clear from detailed descriptions of the preferred embodiment which will be provided below while referring to the attached drawings.

BRIEF DESCRIPTION OF THE DRAWINGS

FIGS. 3A to 3D are first-half step explanatory views showing an example of a step for assembling the differential device.

FIGS. 4A to 4C are latter-half step explanatory views showing the example of the step for assembling the differential device.

DESCRIPTION OF THE PREFERRED EMBODIMENT

An embodiment of the present invention will be hereinbelow described based on a preferred example of the present invention which is shown in the accompanying drawings.

Figure 1:
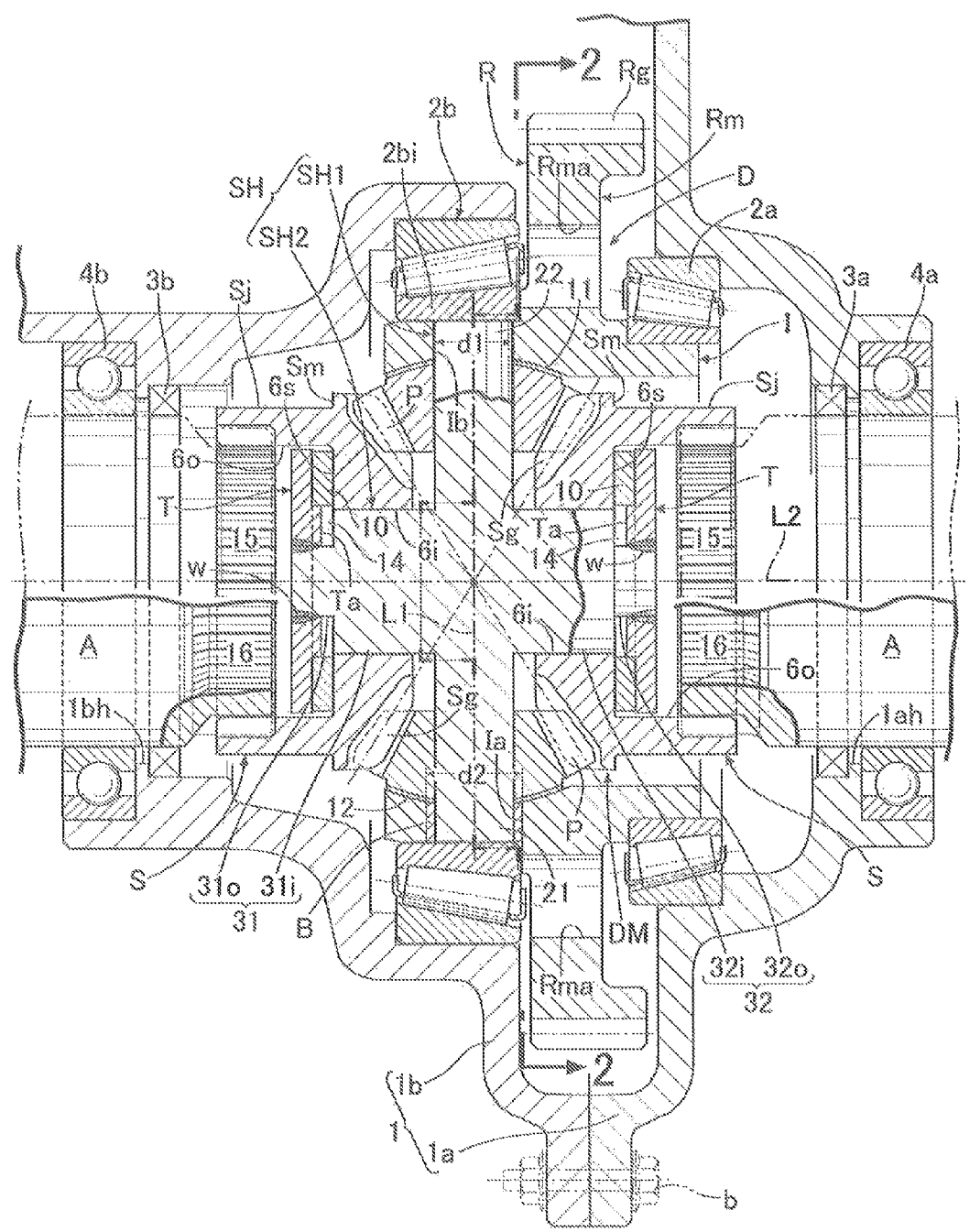
FIG. 1 is a longitudinal sectional view of a differential device and its vicinity of an embodiment of the present invention (a sectional view taken along a 1-1 line in FIG. 2).
Figure 2:
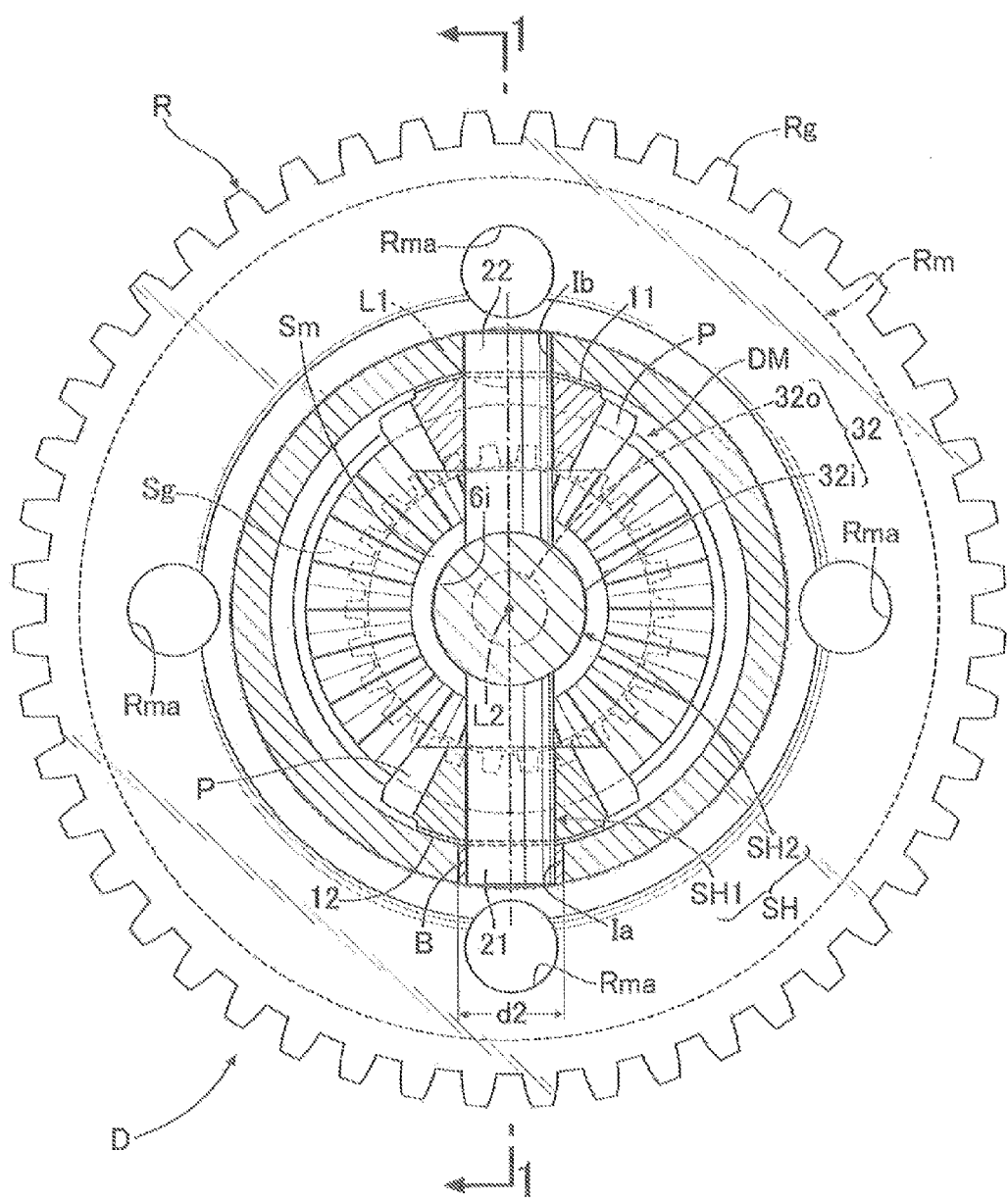
FIG. 2 is a sectional view taken along a 2-2 line in FIG. 1.

First of all, in FIGS. 1 and 2, a differential device D drives a pair of left and right axles while allowing their differential rotations by distributively transmitting a rotational driving force which is transmitted from an engine (not illustrated) mounted on an automobile to a pair of left and right output shafts A, the pair of left and right output shafts A being continuous to the left and right axles. The differential device D is housed and supported, for example, inside a transmission case 1 disposed beside the engine in a front portion of a vehicle body.

The transmission case 1 includes at least first and second case portions 1a, 1b between which the differential device D is interposed from the left and right. The first and second case portions 1a, 1b are detachably joined together by joining means such as bolts b or the like. Through-holes 1ah, 1bh are formed in the first and second case portions 1a, 1b, and the output shafts A are inserted through the through-holes 1ah, 1bh, respectively. Seal members 3a, 3b and bearings 4a, 4b are installed between inner peripheries of the through-holes 1ah, 1bh and outer peripheries of the output shafts A, respectively, the seal members 3a, 3b being formed in an annular shape and sealing clearances between the inner peripheries and the outer peripheries, respectively, and the bearings 4a, 4b being disposed outward of the seal members 3a, 3b, and rotatably supporting the output shafts A, respectively.

The differential device D includes: a ring gear R as a final driven gear for receiving rotational force from the engine as a power source; an input member I having an outer periphery from which the ring gear R is integrally projected and being formed in a cylindrical shape; and a differential mechanism DM distributively transmitting the rotational force which is transmitted from the ring gear R to the input member I to the pair of left and right output shafts A. An outer peripheral portion of the input member I are rotatably supported on the first and second case portions 1a, 1b of the transmission case 1 via a pair of bearings 2a, 2b which are spaced apart in a left-right direction.

The ring gear R includes: a base portion Rm extending radially outward from an outer peripheral surface of an intermediate portion in an axial direction of the input member I (i.e., so as to be interposed between the pair of left and right bearings 2a, 2b) and being formed in a ring plate shape; and an input tooth portion Rg integrally continuous to an outer periphery of the base portion Rm and being wide. A plurality of lightening holes Rma are formed in the base portion Rm. The lightening holes Rma are each capable of functioning as a relief with respect to a first shaft SH1 during a step of assembling the differential mechanism DM, which will be described later, and contribute to weight reduction of the differential device D. In addition, the ring gear R and the input member I can be produced by machining and a variety of plastic working. The production of them by forging, in particular, makes it possible to easily form the lightening holes Rma during a step of forming the ring gear R and the input member I. Incidentally, the ring gear R may be formed separately from the input member I and be subsequently fixed to the input member I by appropriate fixing means such as screwing, welding, press-fitting, crimping, and the like. Furthermore, the input tooth portion Rg of the ring gear R may be a helical gear or a spur gear.

The differential mechanism DM includes: a pair of pinions P; a cross-shaped shaft body SH attached to the input member I so as to rotate integrally with the input member I and rotatably supporting the pinions P; and a pair of side gears S having in outer peripheral portions annular input tooth portions Sg in mesh with the pinions P, and connected to the pair of left and right output shafts A, respectively. In addition, the differential mechanism DM is capable of distributively transmitting to the pair of output shafts A the rotational force which is transmitted from the input member I to the cross-shaped shaft body SH via the pinions P and the pair of side gears S.

The cross-shaped shaft body SH is formed in a cross shape integrally including: the first shaft SH1 whose both end portions 21, 22 supported on the input member I; and a second shaft SH2 orthogonal to the first shaft SH1. The cross-shaped shaft body SH, integrally with the input member I, rotates on an axis L2 of the second shaft SH2. The pair of pinions P are rotatably supported on the both end portions 21, 22 of the first shaft body SH1, respectively. Outer end surfaces of the pinions P are rotatably abutted against and supported on an inner peripheral surface of the input member I with spherical surface-shaped washers 11, 12 interposed therebetween.

Each side gear S includes: a gear main body Sm being formed in an annular shape; the input tooth portion Sg formed in an inner side surface of the gear main body Sm and meshing with the pinions P; and a shaft portion Sj integrally and projecting from an outer side surface of the gear main body Sm, extending outward in an axial direction and being formed in a cylindrical shape.

Furthermore, inner peripheries of the shaft portions Sj of the pair of side gears S are respectively provided with stepped holes respectively formed from small-diameter holes 6i and large-diameter holes 6o, the small-diameter holes 6i rotatably supporting both end portions 31, 32 of the second shaft SH2 of the cross-shaped shaft body SH such that the both end portions 31, 32 pass through the small-diameter holes 6i, and the large-diameter holes 6o being continuous to outer ends of the small-diameter holes 6i in the axial direction via annular step surfaces 6s and opened in outer side surfaces of the side gears S (i.e., outer end surfaces of the shaft portions Sj). Meanwhile, the both end portions 31, 32 of the second shaft SH2 include: inwardly-located larger-diameter portions 31i, 32i; and outwardly-located small-diameter portions 31o, 32o integrally continuous to outer ends of the larger-diameter portions 31i, 32i via step portions. The larger-diameter portions 31i, 32i are relatively rotatably fitted to the respective small-diameter holes 6i, and the small-diameter portions 31o, 32o face insides of the respective large-diameter holes 6o.

Note that although in the illustrated example, the both end portions 31, 32 (particularly, the larger-diameter portions 31i, 32i) of the second shaft SH2 are rotatably fitted directly to the respective small-diameter holes 6i, bearing bushes may be interposed between the fitting portions of the both end portions 31, 32 and the small-diameter holes 6i.

In addition, fixing members T are housed in the large-diameter holes 6o of the shaft portions Sj of the side gears S, the fixing members T being connected to the both end portions 31, 32 of the second shaft SH2 so as to block the side gears S from coming off the second shaft SH2. In the illustrated example, the fixing members T are each formed in a circular ring plate shape, and are fitted to the both end portions 31, 32 (outer peripheries of the small-diameter portions 31o, 32o in the illustrated example) of the second shaft SH2 such that annular washers 10 for space adjustment are relatively rotatably interposed between the fixing members T and the step surfaces 6s surrounding outer end openings of the small-diameter holes 6i, and the fitting surfaces of the end portions 31, 32 and the fixing members T are respectively connected together by weldings w. Incidentally, instead of the weldings w in the illustrated example, other appropriate fixing means such as press-fitting, crimping, screwing and the like may be used as the connecting means.

Furthermore, annular engagement protrusions Ta to which inner peripheral portions of the annular washers 10 are fitted project from inner side surfaces of the fixing members T. End surfaces of the engagement protrusions Ta face the step portions between the larger-diameter portions 31i, 32i and the small-diameter portions 31o, 32o in the both end portions 31, 32 of the second shaft SH2 via annular clearances 14. Incidentally, although not illustrated, washers may be interposed between mutually-facing surfaces of the both end portions 31, 32 of the second shaft SH2 and the engagement protrusions Ta so as to fill the clearances 14. Otherwise, at least one sides in the respective mutually-facing surfaces of the both end portions 31, 32 of the second shaft SH2 and the engagement protrusions Ta may be extended to the other sides inside the clearances 14 so that the mutually-facing surfaces of the both end portions 31, 32 and the engagement protrusions Ta are respectively brought into direct close contact with each other.

Moreover, in the large-diameter holes 6o of the shaft portions Sj of the side gears S, spline teeth 15 are formed on an outer side of the fixing members T in the axial direction. The spline teeth 15 and spline teeth 16 formed in outer peripheries of inner ends of the output shafts A are relatively unrotatably spline-fitted to each other.

Next, descriptions will be provided for a structure for attaching the cross-shaped shaft body SH to the input member I. In the input member I, a pair of support holes Ia, Ib in which the both end portions 21, 22 of the first shaft SH1 are respectively fitted and supported are provided coaxially with the first shaft SH1 (i.e., on an axis L1 of the first shaft SH1). An inner diameter d2 of the one support hole Ia is made sufficiently larger than an outer diameter of the corresponding one end portion 21 of the first shaft SH1. In addition, an inner diameter d1 of the other support hole Ib is made substantially equal to an outer diameter of the corresponding other end portion 22 of the first shaft SH1. Accordingly, the other end portion 22 is insertable into and detachable from the other support hole Ib and can be fitted and supported in the other support hole Ib with no play.

Furthermore, since as described above, the inner diameter of the one support hole Ia is made sufficiently larger than the outer diameter of the corresponding one end portion 21 of the first shaft SH1, below-described steps of attaching the cross-shaped shaft body SH to the input member I (FIGS.

3A to 3D) can be carried out such that: the one end portion 21 of the first shaft SH1 is inserted into the one support hole Ia with the first shaft SH1 inclined to a center axis of the one support hole Ia (see FIGS. 3B to 3D); and after the insertion, the other end portion 22 of the first shaft SH1 is coaxially inserted into the other support hole Ib with the inclination of the first shaft SH1 corrected (see FIGS. 3D to 4B).

Moreover, a bush B as an insert coaxially retaining the one end portion 21 of the first shaft SH1 in the one support hole Ia of the input member I is installed and fixed by press-fitting between the one end portion 21 and the one support hole Ia. The bush B enables the one end portion 21 of the first shaft SH1 to be fitted in the one support hole Ia of the input member I without play, and enables the one end portion 21 to be connected to the one support hole Ia with a certain amount of frictional force. Incidentally, instead of the press-fitting, other appropriate fixing means such as welding, crimping and the like may be used as the fixing means of the bush B.

Besides, when an inner race 2bi of the bearing 2b, which is one of the pair of left and right bearings 2a, 2b, is press-fitted and fixed to an outer periphery of the input member I with the both end portions 21, 22 of the first shaft SH1 fitted and supported in the pair of support holes Ia, Ib of the input member I, the inner race 2bi is engaged with both end surfaces of the first shaft SH1. Thereby, the first shaft SH1 is securely fixed to the input member I.

Next, descriptions will be provided for an operation of the embodiment. In the differential device D of the embodiment, in a case where the input member I receives the rotational force from the engine via the ring gear R, when the pinions P, together with the cross-shaped shaft body SH, revolve around the axis L2 of the second shaft SH2 without rotating on the axis L1 of the first shaft SH1, the left and right side gears S are driven to rotate at the same speed, and thereby the driving force is equally transmitted to the left and right output shafts A. On the other hand, when turn traveling or the like of the automobile causes difference in rotational speed between the left and right output shafts A, the pinions P revolve around the axis L2 of the second shaft SH2 while rotating on the axis L1 of the first shaft SH1 so that the rotational driving force is transmitted from the pinions P to the left and right side gears S while allowing differential rotation of the left and right side gears S. The above is the same as the operation of the conventional well-known differential devices.

Meanwhile, in the assembling steps of the embodiment, installation of the differential device D in the transmission case 1 is achieved by: first of all, assembling the differential device D as a single unit body formed from the input member I and the differential mechanism DM including as its main components the pinions P, the cross-shaped shaft body SH and the both side gears S; and subsequently assembling the input member I of the differential device D to the first and second case portions 1a, 1b of the transmission case 1 via the bearings 2a, 2b. Thereafter, from this state, the inner ends of the left and right output shafts A are respectively spline-fitted as at 15, 16 to the shaft portions Sj of the left and right side gears S of the differential device D. Thereby, the both side gears S and the both output shafts A are connected together.

Next, referring to FIGS. 3A to 3D and FIGS. 4A to 4C together, descriptions will be provided for an example of a method of assembling (i.e., manufacturing) the differential device D.

The steps of assembling the differential device D of the embodiment includes at least steps [1] to [6] as follows.

[1] To begin with, a step of obtaining a sub-assembly U1 by assembling the pair of pinions P and the one washer 11 to the first shaft SH1 of the cross-shaped shaft body SH, as shown in FIG. 3A.

[2] Subsequently, a step of shallowly inserting the one end portion 21 of the first shaft SH1 into the one support hole Ia of the input member I by putting the sub-assembly U1 into an inclined orientation with the first shaft SH1 inclined to the axis of the one support hole Ia, as shown in FIG. 3B.

[3] Subsequently, a step of deeply inserting the one end portion 21 of the first shaft SH1 into the one support hole Ia by moving the sub-assembly U1 toward one side (downward in the illustrated example) along the axis L1 of the first shaft SH1 while gradually changing the orientation of the sub-assembly U1 in a direction in which the inclination of the first shaft SH1 is corrected, as shown in FIGS. 3B to 3D.

Figures 4A, 4B, 4C:
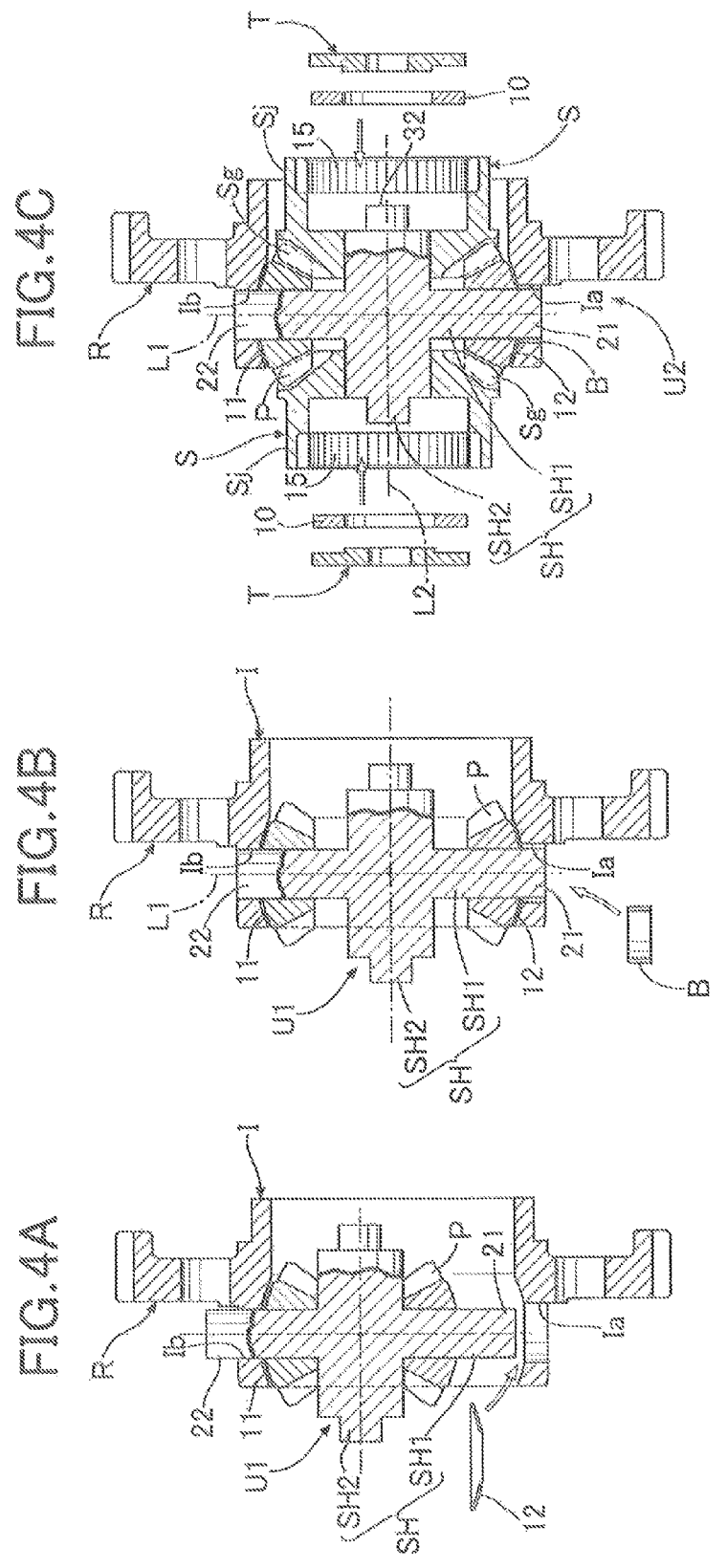

[4] Subsequently, a step of coaxially and deeply inserting the other end portion 22 of the first shaft SH1 into the other support hole Ib by moving the sub-assembly U1, with the inclined orientation fully corrected, toward the other side (upward in the illustrated example) along the axis L1 of the first shaft SH1, and attaching the other washer 12 to the one end portion 21 of the first shaft SH1 by temporarily separating the one end portion 21 of the first shaft SH1 from the one support hole Ia, as shown in FIG. 4A.

[5] Subsequently, a step of obtaining a secondary sub-assembly U2 formed from the pinions P, the cross-shaped shaft body SH and the input member I by: inserting again the one end portion 21 of the first shaft SH1 into the one support hole Ia; thereafter press-fitting the bush B between the one end portion 21 of the first shaft SH1 and the one support hole Ia; and coaxially retaining the one end portion 21 in the one support hole Ia and fixing the first shaft SH1 to the input member I, as shown in FIGS. 4B and 4C.

[6] Eventually, a step of obtaining a final assembled body of the differential device D by: fitting the small-diameter holes 6i of the both side gears S to the large-diameter portions 31i, 32i of the both end portions 31, 32 of the second shaft SH2; and thereafter, inside the large-diameter holes 6o of the both side gears S, connecting the pair of fixing members T to the small-diameter portions 31o, 32o of the both end portions 31, 32 of the second shaft SH2 so as to relatively rotatably retain the both side gears S on the both end portions 31, 32 of the second shaft SH2 such that the both side gears S are blocked from coming off the both end portions 31, 32, as shown in FIG. 4C.

It should be noted that the assembled state of the sub-assembly U1 obtained in step [1] is maintained by, in the ensuing steps, an operator's supporting the pinions P by hand or with a jig (not illustrated) for the assembling equipment in order for the pinions P not to come off the first shaft SH1. Furthermore, in step [3], the one end portion 21 of the first shaft SH1 temporarily enters one of the lightening holes Rma in the ring gear R, and thereby can easily avoid hitting the ring gear R. For this reason, change in the orientation of the sub-assembly U1 (i.e., an action of correcting the inclined orientation shown in FIGS. 3B to 3D) can be achieved easily.

Furthermore, it should be noted that the procedure for assembling the washers 11, 12 to the first shaft SH1 is not limited to that of the foregoing embodiment. In other words, the timing of the assembling may be changed to any timing, if necessary, as long as the timing of the assembling does not hinder the sub-assembly U1 from being assembled to the input member I. For example, the washer 11 may be assembled in a stage shown in FIG. 3D. Meanwhile, the washer 12 may be assembled in a stage shown in FIG. 3A, as long as the presence of the washer 12 does not hinder the sub-assembly U1 from being assembled to the input member I in a later stage.

Thus, in the embodiment, the employment of the foregoing steps enables the followings. Specifically, after the sub-assembly U1 is assembled by attaching the pinions P to the first shaft SH1 of the cross-shaped shaft body SH, the one end portion 21 of the first shaft SH1 is firstly inserted into the one support hole Ia with the sub-assembly U1 put into the inclined orientation where the first shaft SH1 is inclined to the axis of the one support hole Ia of the input member I. Then, after the insertion, the sub-assembly U1 is moved reciprocatingly in the direction along the axis L1 of the first shaft SH1 as needed, while the orientation of the sub-assembly U1 is changed to gradually correct the inclined orientation. Thus, the both end portions 21, 22 of the first shaft SH1 can be respectively inserted coaxially into the support holes Ia, Ib of the input member I. Subsequently, the bush B is press-fitted between the one end portion 21 of the first shaft SH1 and the one support hole Ia so that the one end portion 21 can be coaxially retained in the one support hole Ia and the first shaft SH1 can be fixed to the input member I. Thereafter, the small-diameter holes 6i of the both side gears S are fitted to the both end portions 31, 32 of the second shaft SH2, and after the fitting, the pair of fitting members T are respectively connected to the both end portions 31, 32 of the second shaft SH2 in the large-diameter holes 6o of the both side gears S so as to be able to relatively rotatably retain the both side gears S on the both end portions 31, 32 of the second shaft SH2, respectively, such that the both side gears S are blocked from coming off the both end portions 31, 32.

Furthermore, the employment of such an assembling method of the embodiment makes it possible to assemble the sub-assembly U1, which is beforehand obtained by installing the pinions P into the cross-shaped shaft body SH, to the input member I at a time, and to easily assembling the pair of side gears S to the thus-obtained assembled body (i.e., the secondary sub-assembly U2) without being hindered by the input member I. Thus, the assembling work as a whole is easy to perform and an improvement in productivity can be achieved.

Moreover, in the foregoing embodiment, the small-diameter holes 6i and the large-diameter holes 6o are formed in the side gears S, the small-diameter holes 6i rotatably supporting the second shaft SH2 of the cross-shaped shaft body SH such that the second shaft SH2 passes through the small-diameter holes 6i and the large-diameter holes 6o being continuous to the outer ends of the small-diameter holes 6i via the step surfaces 6s and opened in the outer side ends of the side gears S. In addition, the large-diameter holes 6o house the fixing members T which are connected to the end portions 31, 32 of the second shaft SH2 so as to block the side gears S from coming off the second shaft SH2. Thus, with the fixing members T, the both side gears S can be accurately retained on the end portions 31, 32 of the second shaft SH2 with predetermined assembling precision, and the differential mechanism DM including the pinions P, the cross-shaped shaft body SH and the both side gears S can be handled as a single assembled unit body using no case.

Thereby, it is not necessary to specially provide any large-size case covering the differential mechanism DM or any conventional differential case in order to fix the side gears S at the assembled positions (i.e., keep the assembled state of the differential mechanism DM). Accordingly, simplification of the structure and weight reduction in the differential device D as a whole can be achieved. Furthermore, since the case-less differential mechanism DM can be assembled as a unit with predetermined precision, accuracy assurance of the differential mechanism DM alone is made possible. Moreover, since the output shafts A are relatively unrotatably spline-fitted to the larger-diameter holes 6o of the side gears S outside the fixing members T in the axial direction, the output shafts A and the second shaft SH2 can be accurately connected together without interfering with the fixing members T.

Besides, since the fixing members T of the embodiment are connected to the second shaft SH2 with the annular washers 10 interposed between the fixing members T and the step surfaces 6s surrounding the outer end openings of the small-diameter holes 6i of the side gears S, spaces between the fixing members T and the side gears S can be easily and accurately adjusted in the step of assembling the differential mechanism DM by selective use of beforehand-prepared washers 10 with different thicknesses, wherein axial positions of the side gears S relative to the second shaft SH2 have to be set with backlash between meshing portions of the pinions P and the side gears S or the like taken into consideration. Thus, the accuracy assurance of the differential mechanism DM alone is made much easier. Incidentally, the annular washers 10 may be omitted as long as the accuracy can be secured without providing the washers 10.

Although the embodiment of the present invention has been described, the present invention is not limited to the embodiment. Various design changes may be made to the present invention within a scope not departing from the gist of the present invention.

For example, the foregoing embodiment has been shown in which: in step [2] described above, the one end portion 21 of the first shaft SH1 is temporarily inserted shallowly into the one support hole Ia with the sub-assembly U1 put in the inclined orientation (FIG. 3B); and thereafter, in step [3] described above, the one end portion 21 of the first shaft SH1 is inserted deeply into the one support hole Ia by moving the sub-assembly U1 in the direction along the axis L1 of the first shaft SH1 while changing the orientation (correcting the inclined orientation) (FIGS. 3B and 3C). However, the insertion method is not limited to that of the embodiment. For example, when the inner diameter of the one support hole Ia (accordingly, the clearance between the support hole Ia and the one end portion 21 of the first shaft SH1) is set sufficiently large, the one end portion 21 of the first shaft SH1 may be deeply inserted into the one support hole Ia at one action with the sub-assembly U1 put in the inclined orientation in step [2] described above (as shown in the state illustrated in FIG. 3C). In this case, the sub-assembly U1 is manipulated for the orientation change (i.e., the inclined orientation is corrected) after the insertion.

In addition, the foregoing embodiment has been shown in which in step [3] described above, the one end portion 21 of the first shaft SH1 can easily avoid hitting the ring gear R by temporarily entering one of the lightening holes Rma in the ring gear R. However, depending on the size or the like of the one support hole Ia, there may be a case where in step [3] described above, the one end portion 21 of the first shaft SH1 can easily avoid hitting the ring gear R even if no lightening holes Rma are formed in the ring gear R. In this case, the lightening holes Rma may be omitted.

Furthermore, the foregoing embodiment has been shown in which the ring-shaped fixing members T that are housed in the large-diameter holes 6o and connected to the both end portions 31, 32 of the second shaft SH2 are used to retain the side gears S on the second shaft SH2 so as to block the side gears S from coming off the second shaft SH2. However, the shape and structure of the fixing members T are not limited to those of the embodiment. That is, the shape and structure of the fixing members T may be variously changed as long as the fixing members T fulfill the function of relatively rotatably retaining the side gears S on both end portions 31, 32 of the second shaft SH2 inside the large-diameter holes 6o so as to block the side gears S from coming off the second shaft SH2, and do not mechanically interfere with the output shafts A.

Moreover, since the foregoing embodiment employs the structure where the first shaft SH1 is inserted and supported in the pair of support holes Ia, Ib of the input member I, the sub-assembly U1 including the pinions P and the cross-shaped shaft body SH is assembled to the input member I; and thereafter, the left and right side gears S are fixed to the second shaft SH2. However, depending on a form of supporting the first shaft SH1 on the input member I, after the left and right side gears S are fixed to the second shaft SH2 (i.e., after the differential mechanism DM as the sub-assembly is assembled from the pinions P, the cross-shaped shaft body SH and the both side gears S), this assembled differential mechanism DM may be assembled to the input member I.

In addition, in the foregoing embodiment, the differential device D allows the difference in rotation between the left and right axles, but may also allow the difference in rotation between front wheels and rear wheels.

What is claimed is:

1. A differential device comprising:
an input member inputted with rotational force and being formed in an annular shape;
a cross-shaped shaft body integrally including
a first shaft having both end portions supported on the input member, and
a second shaft orthogonal to the first shaft,
the cross-shaped shaft body configured to rotate integrally with the input member around an axis of the second shaft,
a pinion rotatably supported on the first shaft; and
a pair of side gears meshing with the pinion and respectively connected to a pair of output shafts,
the differential device configured to distributively transmit the rotational force which is transmitted from the input member to the cross-shaped shaft body to the pair of output shafts via the pinion and the pair of side gears, wherein
the side gears respectively include
small-diameter holes relatively rotatably supporting the second shaft such that the second shaft passes through the small-diameter holes, and
large-diameter holes continuous to outer ends of the small-diameter holes in an axial direction via step surfaces and opened in outer side surfaces of the side gears,
the large-diameter holes respectively house fixing members, the fixing members connecting to both end portions of the second shaft and blocking the side gears from coming off the second shaft, and
the output shafts are relatively unrotatably fitted in the large-diameter holes outside the fixing members in an axial direction.

2. The differential device according to claim 1, wherein annular washers are clamped between the fixing members and the step surfaces so as to allow relative rotation therebetween.

3. The differential device according to claim 2, wherein
in the input member, a pair of support holes in which the both end portions of the first shaft are fitted and supported are provided coaxially with the first shaft,
one support hole of the support holes has an inner diameter which is larger than an outer diameter of the one end portion of the first shaft so as to allow the one end portion to be inserted into the one support hole with the first shaft put in an orientation inclined to an axis of the support hole, and
an insert coaxially retaining the one end portion in the one support hole is provided between the one end portion and the one support hole.

4. A method of manufacturing the differential device according to claim 3, comprising at least the steps of:
obtaining a sub-assembly by assembling the pinion to the first shaft of the cross-shaped shaft body;
inserting the one end portion of the first shaft into the one support hole with the sub-assembly put in an inclined orientation where the first shaft is inclined to the axis of the support holes of the input member, and thereafter inserting the other end portion of the first shaft into the other support hole by moving the sub-assembly in a direction along an axis of the first shaft with the inclined orientation corrected;
subsequently, attaching the insert by inserting the insert between the one end portion of the first shaft and the one support hole so as to coaxially retain the one end portion in the one support hole and fix the first shaft to the input member; and
subsequently, fitting the small-diameter holes of the pair of side gears to the both end portions of the second shaft, and thereafter connecting the pair of fixing members to the both end portions of the second shaft inside the large-diameter holes so as to retain the both side gears on the both end portions of the second shaft such that the side gears are blocked from coming off the both end portions.

5. The differential device according to claim 1, wherein
in the input member, a pair of support holes in which the both end portions of the first shaft are fitted and supported are provided coaxially with the first shaft,
one support hole of the support holes has an inner diameter which is larger than an outer diameter of the one end portion of the first shaft so as to allow the one end portion to be inserted into the one support hole with the first shaft put in an orientation inclined to an axis of the support hole, and
an insert coaxially retaining the one end portion in the one support hole is provided between the one end portion and the one support hole.

6. A method of manufacturing the differential device according to claim 5, comprising at least the steps of:
obtaining a sub-assembly by assembling the pinion to the first shaft of the cross-shaped shaft body;
inserting the one end portion of the first shaft into the one support hole with the sub-assembly put in an inclined orientation where the first shaft is inclined to the axis of the support holes of the input member, and thereafter inserting the other end portion of the first shaft into the other support hole by moving the sub-assembly in a direction along an axis of the first shaft with the inclined orientation corrected;
subsequently, attaching the insert by inserting the insert between the one end portion of the first shaft and the one support hole so as to coaxially retain the one end portion in the one support hole and fix the first shaft to the input member; and subsequently, fitting the small-diameter holes of the pair of side gears to the both end portions of the second shaft, and thereafter connecting the pair of fixing members to the both end portions of the second shaft inside the large-diameter holes so as to retain the both side gears on the both end portions of the second shaft such that the side gears are blocked from coming off the both end portions.

* * * * *